(12) United States Patent
Zhao et al.

(10) Patent No.: US 10,315,781 B2
(45) Date of Patent: Jun. 11, 2019

(54) GIMBAL, IMAGING DEVICE AND UNMANNED AERIAL VEHICLE USING THE GIMBAL

(71) Applicant: SZ DJI OSMO TECHNOLOGY CO., LTD., Shenzhen (CN)

(72) Inventors: Tao Zhao, Shenzhen (CN); Qilong Yan, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/438,963

(22) Filed: Feb. 22, 2017

(65) Prior Publication Data
US 2017/0174362 A1    Jun. 22, 2017

Related U.S. Application Data

(63) Continuation of application No. PCT/CN2014/087278, filed on Sep. 24, 2014.

(51) Int. Cl.
| | | |
|---|---|---|
| *B64C 39/02* | (2006.01) | |
| *B64D 47/08* | (2006.01) | |
| *F16M 11/04* | (2006.01) | |
| *F16M 11/10* | (2006.01) | |
| *F16M 11/18* | (2006.01) | |
| *F16M 11/20* | (2006.01) | |
| *F16M 13/02* | (2006.01) | |

(Continued)

(52) U.S. Cl.
CPC ............ *B64D 47/08* (2013.01); *B64C 39/024* (2013.01); *F16M 11/041* (2013.01); *F16M 11/10* (2013.01); *F16M 11/18* (2013.01); *F16M 11/2071* (2013.01); *F16M 13/02* (2013.01); *G03B 15/006* (2013.01); *G03B 17/561* (2013.01); *H04N 5/2252* (2013.01); *H04N 5/2253* (2013.01); *B64C 2201/127* (2013.01)

(58) Field of Classification Search
CPC ...................................................... G03B 17/56
USPC ........................................................ 396/428
See application file for complete search history.

(56) References Cited

U.S. PATENT DOCUMENTS

| | | |
|---|---|---|
| 1,485,775 A | 3/1924 | Fales |
| 2,130,914 A | 9/1938 | Warren |

(Continued)

FOREIGN PATENT DOCUMENTS

| | | |
|---|---|---|
| CN | 101446743 A | 6/2009 |
| CN | 101554925 A | 10/2009 |

(Continued)

OTHER PUBLICATIONS

Mingliang, Zhu, Cradel Head System, WO2015180004, PCT/CN2014/078358, May 25, 2014, 33 pages.*

(Continued)

*Primary Examiner* — Clayton E. LaBalle
*Assistant Examiner* — Kevin C Butler
(74) *Attorney, Agent, or Firm* — Anova Law Group, PLLC

(57) ABSTRACT

A gimbal comprises a carrying plate, a quick release assembly detachably mounted on the carrying plate and configured to detachably mount the gimbal on an unmanned aerial vehicle, and an angle adjusting mechanism rotatably disposed on the carrying plate and configured to connect with a load and to drive the load to rotate. The quick release assembly and the angle adjusting mechanism are arranged side by side on the carrying plate.

20 Claims, 7 Drawing Sheets

(51) Int. Cl.
*G03B 15/00* (2006.01)
*G03B 17/56* (2006.01)
*H04N 5/225* (2006.01)

(56) References Cited

U.S. PATENT DOCUMENTS

| | | | | |
|---|---|---|---|---|
| 2,181,949 | A | 12/1939 | Mercier | |
| 4,825,232 | A * | 4/1989 | Howdle | B64D 47/08 396/12 |
| 7,905,463 | B2 * | 3/2011 | Burnham | F16M 11/123 248/177.1 |
| 2004/0173726 | A1 * | 9/2004 | Mercadal | F16M 11/10 248/660 |
| 2013/0051782 | A1 * | 2/2013 | Dimotakis | G03B 15/006 396/428 |
| 2013/0105619 | A1 * | 5/2013 | Buscher | B64D 47/08 244/17.11 |
| 2014/0037278 | A1 * | 2/2014 | Wang | F16M 11/10 396/55 |
| 2014/0327764 | A1 * | 11/2014 | Nelson | H04N 5/2252 348/143 |
| 2016/0023778 | A1 * | 1/2016 | Zhao | B64D 47/08 396/12 |
| 2016/0229556 | A1 * | 8/2016 | Zhou | B64D 47/08 |
| 2016/0352992 | A1 * | 12/2016 | Saika | H04N 5/2328 |
| 2017/0078538 | A1 * | 3/2017 | Zhu | H04N 5/232 |
| 2017/0114954 | A1 * | 4/2017 | Zhao | F16M 11/06 |
| 2017/0146893 | A1 * | 5/2017 | Tang | G03B 17/561 |
| 2017/0163896 | A1 * | 6/2017 | Kang | H04N 5/23287 |
| 2017/0174362 | A1 * | 6/2017 | Zhao | F16M 11/041 |
| 2017/0191613 | A1 * | 7/2017 | Liu | B64D 47/08 |
| 2017/0192338 | A1 * | 7/2017 | Sun | G03B 15/006 |

FOREIGN PATENT DOCUMENTS

| | | | |
|---|---|---|---|
| CN | 101758929 | * 6/2010 | B64D 47/08 |
| CN | 101758929 A | 6/2010 | |
| CN | 202647109 U | 1/2013 | |
| CN | 203047530 U | 7/2013 | |
| CN | 203246584 U | 10/2013 | |
| CN | 203727653 U | 7/2014 | |
| CN | 203793655 U | 8/2014 | |
| CN | 204250379 U | 4/2015 | |
| EP | 2066114 A1 | 6/2009 | |
| JP | S4945690 Y1 | 12/1974 | |
| JP | H07103394 A | 4/1995 | |
| JP | 2002131830 A | 5/2002 | |
| JP | 2004242128 A | 8/2004 | |
| JP | 2005234230 A | 9/2005 | |
| KR | 20120037584 A | 4/2012 | |

OTHER PUBLICATIONS

The World Intellectual Property Organization (WIPO) International Search Report for PCT/CN2014/087278 dated Jun. 19, 2015 5 Pages.

* cited by examiner

GIMBAL, IMAGING DEVICE AND UNMANNED AERIAL VEHICLE USING THE GIMBAL

CROSS-REFERENCE TO RELATED APPLICATION

This application is a continuation application of International Application No. PCT/CN2014/087278, filed on Sep. 24, 2014, the entire contents of which are incorporated herein by reference.

TECHNICAL FIELD

The present disclosure relates to a gimbal and an imaging device used thereof as well as an unmanned aerial vehicle.

BACKGROUND

Various connections, such as a mechanical connection and a signal line connection can exist between a gimbal of an aerial vehicle and the aerial vehicle. The mechanical connection may be typically a fixed connection, and most of the times a fixed connection with a screw. A user of an aerial vehicle may choose whether to install a gimbal on the aerial vehicle according to his/her own needs when using the aerial vehicle. A conventional connection between the gimbal and the aerial vehicle may include a quick release connection. In a conventional structural design, a quick release assembly is arranged coaxially with a yaw axis of the gimbal to mount the gimbal on the aerial vehicle. Such a structure increases an altitude in a vertical direction, making it difficult to lower the center of gravity and influencing the artistic appearance when installed on the aerial vehicle.

SUMMARY

The technical problem to be solved mainly by the present disclosure is to provide a gimbal that may decrease an altitude, and an imaging device using the same.

According to one aspect of the present disclosure, there is provided a gimbal comprising a carrying plate, a quick release assembly detachably mounted on the carrying plate and configured to detachably mount the gimbal on an unmanned aerial vehicle, and an angle adjusting mechanism rotatably disposed on the carrying plate and configured to connect with a load and to drive the load to rotate. The quick release assembly and the angle adjusting mechanism may be arranged side by side on the carrying plate.

In some embodiments, the angle adjusting mechanism may comprise an electronic speed adjustor, a yaw-axis motor electrically connected with the electronic speed adjustor, and a bracket rotatably connected with the yaw-axis motor.

In some embodiments, the carrying plate may be a flat plate comprising a first surface including a receiving groove and a second surface arranged opposite to the first surface. The electronic speed adjustor may be disposed within the receiving groove and covered by the quick release assembly.

In some embodiments, the gimbal may further comprise a stopping device provided on the second surface of the carrying plate. A rotating shaft of the yaw-axis motor may be received in the stopping device. One end of the bracket may be received within the stopping device and connected with the rotating shaft of the yaw-axis motor.

In some embodiments, the carrying plate may have a "Z"-shaped structure and comprise a first carrying portion, a second carrying portion, and a connecting portion connecting the first carrying portion and the second carrying portion. The first carrying portion may comprise a first plane and a second plane arranged opposite to each other. The first electronic speed adjustor may be disposed on the first plane. The second carrying portion may carry the quick release assembly. An altitude of the first carrying portion along a vertical direction of the first carrying portion may be greater than an altitude of the second carrying portion along a direction perpendicular to the first carrying portion.

In some embodiments, the gimbal may further comprise a cover body disposed on the carrying plate and covering the electronic speed adjustor.

In some embodiments, the angle adjusting mechanism may further comprise a yaw motor connecting shaft. One end of the yaw motor connecting shaft may be fixed on the second plane, and another end of the yaw motor connecting shaft may be connected to one end of the bracket through the yaw-axis motor.

In some embodiments, the yaw-axis motor may be a brushless motor. A stator of the yaw-axis motor may be fixed to the yaw motor connecting shaft and a rotator of the yaw-axis motor may be received at the one end of the bracket.

In some embodiments, the angle adjusting mechanism may be a first angle adjusting mechanism, the electronic speed adjustor may be a first electronic speed adjustor, and the bracket may be a first bracket. The gimbal may further comprise a second angle adjusting mechanism comprising a second electronic speed adjustor, a connecting shaft, a second bracket, and a roll-axis motor. The second electronic speed adjustor may be received at one end of the first bracket distal from the carrying plate. One end of the connecting shaft may be fixed to the one end of the first bracket distal from the carrying plate and another end of the connecting shaft may be connected to one end of the second bracket through the roll-axis motor.

In some embodiments, the roll-axis motor may be a brushless motor. A stator of the roll-axis motor may be fixed to the connecting shaft and a rotator of the roll-axis motor may be received at the one end of the second bracket.

In some embodiments, the connecting shaft may be a first connecting shaft. The gimbal may further comprise a third angle adjusting mechanism comprising a third electronic speed adjustor, a second connecting shaft, and a pitch-axis motor. The third electronic speed adjustor may be received at another end of the second bracket distal from the first bracket. One end of the second connecting shaft may be fixed to the other end of the second bracket distal from the first bracket and another end of the second connecting shaft may be configured to be connected to the load through the pitch-axis motor.

In some embodiments, the pitch-axis motor may be a brushless motor A stator of the pitch-axis motor may be fixed to the second connecting shaft and a rotator of the pitch-axis motor may be configured to be received at the load.

In some embodiments, the load may be a photographic element.

In some embodiments, the photographic element may comprise a casing and an image sensor and an image processing circuit received within the casing. The image processing circuit may be electrically connected with the image sensor.

In some embodiments, the quick release assembly may comprise a first barrel body, a second barrel body received within the first barrel body, a plug-in member detachably mounted between the first barrel body and the second barrel body, and a connecting plate fixedly connected with the second barrel body and configured to connect with the unmanned aerial vehicle. The first barrel body may comprise a first end and a second end disposed opposite to each other in an axial direction of the first barrel body. A sliding slot may be provided on inner wall of the first end and extend along a circumferential direction of the inner wall. A passage may be formed at an end portion of the sliding slot. A first stopping boss may be provided on an end face of the second end. The first barrel body and the second barrel body may be coaxial and rotatably connected with each other. A protruding bar may be formed on and protrude from a periphery of the plug-in member. The protruding bar may match with the passage and be configured to enter into or exit from the sliding slot through the passage. A second stopping boss may be provided on the connecting plate and configured to abut against the first stopping boss to limit a rotating position of the first barrel body. The first barrel body may be configured to rotate to a position that the first stopping boss abuts against the second stopping boss to allow the protruding bar to enter into or exit from the sliding slot through the passage.

In some embodiments, the plug-in member may be fixed on the carrying plate.

In some embodiments, the first barrel body may further comprise a side plate provided on and extend outward on the second end. The side plate may comprise a horizontal end and a vertical end. The first stopping boss may comprise a connecting portion and a shifting portion. The connecting portion may be disposed on an end face of the vertical end and include an arc-shaped protruding bar. The shifting portion may be arranged on and protrude from a periphery of the first barrel body, and located at a center of the connecting portion. The first barrel body may be configured to rotate about an axis of the first barrel body when the shifting portion is shifted.

In some embodiments, a through hole may be provided at a center of the shifting portion Two plunger holes may be provided on a periphery of the second barrel body. A distance between centers of the two plunger holes may be equal to a length of the connecting portion. The gimbal may further comprise a plunger disposed within the through hole and configured to match with one of the two plunger holes when the first barrel rotates to the position that the first stopping boss abuts against the second stopping boss.

In some embodiments, the second barrel body may comprise a step face extending outward and configured to abut against an end face of the horizontal end. The step face may be configured to connect the first barrel body and the second barrel body to sleeve the second barrel body within the first barrel body.

In some embodiments, the second stopping boss may include an arc-shaped strip provided on the connecting plate and may be attached with an end face of the vertical end.

In some embodiments, the first barrel body may comprise three passages disposed on the end portion of the sliding slot adjacent to the first end. The plug-in member may comprise three protruding bars matching with the three passages, respectively.

In some embodiments, the first barrel body may further comprise three strip-shaped protrusions protruding on an inner wall of the first end. The three strip-shaped protrusions may each be an arc-shaped strip. The three strip-shaped protrusions and an end face of the horizontal end may form the sliding slot. The three passages may be formed between the three strip-shaped protrusions.

In some embodiments, the three protruding bars may each be an arc-shaped protruding bar provided on the periphery of the plug-in member.

In some embodiments, the gimbal may further comprise a first connector disposed on the connecting plate, and a second connector provided on the plug-in member. The first connector and the second connector may be configured to be electrically connected with each other when the first stopping boss abuts against the second stopping boss.

In some embodiments, the quick release assembly may further comprise an elastic member elastically connected between the plug-in member and the first barrel body in an axial direction.

In some embodiments, the elastic member may include a cushion and be configured to be compressed by the first barrel body when the plug-in member is connected with the first barrel body.

In some embodiments, the gimbal may further comprise two guiding posts disposed on the plug-in member. The two guiding posts may penetrate through the elastic member and be disposed symmetrically relative to a center of the elastic member. Two guiding holes may be provided on the second barrel body. The two guiding posts may be inserted through the two guiding holes.

According to another aspect of the present disclosure, there is provided an imaging device comprising a photographic element and a gimbal carrying the photographic element. The gimbal may comprise a carrying plate, a quick release assembly detachably mounted on the carrying plate and configured to detachably mount the gimbal on an unmanned aerial vehicle, and an angle adjusting mechanism rotatably disposed on the carrying plate and connected with the photographic element. The angle adjusting mechanism may be configured to drive the photographic element to rotate. The quick release assembly and the angle adjusting mechanism may be arranged side by side on the carrying plate.

In some embodiments, the angle adjusting mechanism may comprise an electronic speed adjustor, a yaw-axis motor electrically connected with the electronic speed adjustor, and a bracket rotatably connected with the yaw-axis motor.

In some embodiments, the carrying plate may be a flat plate comprising a first surface including a receiving groove and a second surface arranged opposite to the first surface. The electronic speed adjustor may be disposed within the receiving groove and covered by the quick release assembly.

In some embodiments, the gimbal may further comprise a stopping device provided on the second surface of the carrying plate. A rotating shaft of the yaw-axis motor may be received in the stopping device. One end of the bracket may be received within the stopping device and connected with the rotating shaft of the yaw-axis motor.

In some embodiments, the carrying plate may have a "Z"-shaped structure and comprise a first carrying portion, a second carrying portion, and a connecting portion connecting the first carrying portion and the second carrying portion. The first carrying portion may comprise a first plane and a second plane arranged opposite to each other. The first electronic speed adjustor may be disposed on the first plane. The second carrying portion may carry the quick release assembly. An altitude of the first carrying portion along a vertical direction of the first carrying portion may be greater than an altitude of the second carrying portion along a direction perpendicular to the first carrying portion.

In some embodiments, the gimbal may further comprise a cover body disposed on the carrying plate and covering the electronic speed adjustor.

In some embodiments, the angle adjusting mechanism may further comprise a yaw motor connecting shaft. One end of the yaw motor connecting shaft may be fixed on the second plane, and another end of the yaw motor connecting shaft may be connected to one end of the bracket through the yaw-axis motor.

In some embodiments, the yaw-axis motor may be a brushless motor. A stator of the yaw-axis motor may be fixed to the yaw motor connecting shaft and a rotator of the yaw-axis motor may be received at the one end of the bracket.

In some embodiments, the angle adjusting mechanism may be a first angle adjusting mechanism, the electronic speed adjustor may be a first electronic speed adjustor, and the bracket may be a first bracket. The gimbal may further comprise a second angle adjusting mechanism comprising a second electronic speed adjustor, a connecting shaft, a second bracket, and a roll-axis motor. The second electronic speed adjustor may be received at one end of the first bracket distal from the carrying plate. One end of the connecting shaft may be fixed to the one end of the first bracket distal from the carrying plate and another end of the connecting shaft may be connected to one end of the second bracket through the roll-axis motor.

In some embodiments, the roll-axis motor may be a brushless motor. A stator of the roll-axis motor may be fixed to the connecting shaft and a rotator of the roll-axis motor may be received at the one end of the second bracket.

In some embodiments, the connecting shaft may be a first connecting shaft. The gimbal may further comprise a third angle adjusting mechanism comprising a third electronic speed adjustor, a second connecting shaft, and a pitch-axis motor. The third electronic speed adjustor may be received at another end of the second bracket distal from the first bracket. One end of the second connecting shaft may be fixed to the other end of the second bracket distal from the first bracket and another end of the second connecting shaft may be configured to be connected to the load through the pitch-axis motor.

In some embodiments, the pitch-axis motor may be a brushless motor A stator of the pitch-axis motor may be fixed to the second connecting shaft and a rotator of the pitch-axis motor may be configured to be received at the load.

In some embodiments, the photographic element may comprise a casing and an image sensor and an image processing circuit received within the casing. The image processing circuit may be electrically connected with the image sensor.

In some embodiments, the quick release assembly may comprise a first barrel body, a second barrel body received within the first barrel body, a plug-in member detachably mounted between the first barrel body and the second barrel body, and a connecting plate fixedly connected with the second barrel body and configured to connect with the unmanned aerial vehicle. The first barrel body may comprise a first end and a second end disposed opposite to each other in an axial direction of the first barrel body. A sliding slot may be provided on an inner wall of the first end and extend along a circumferential direction of the inner wall. A passage may be formed at an end portion of the sliding slot. A first stopping boss may be provided on an end face of the second end. The first barrel body and the second barrel body may be coaxial and rotatably connected with each other. A protruding bar may be formed on and protrude from a periphery of the plug-in member. The protruding bar may match with the passage and be configured to enter into or exit from the sliding slot through the passage. A second stopping boss may be provided on the connecting plate and configured to abut against the first stopping boss to limit a rotating position of the first barrel body. The first barrel body may be configured to rotate to a position that the first stopping boss abuts against the second stopping boss to allow the protruding bar to enter into or exit from the sliding slot through the passage.

In some embodiments, the plug-in member may be fixed on the carrying plate.

In some embodiments, the first barrel body may further comprise a side plate provided on and extend outward on the second end. The side plate may comprise a horizontal end and a vertical end. The first stopping boss may comprise a connecting portion and a shifting portion. The connecting portion may be disposed on an end face of the vertical end and include an arc-shaped protruding bar. The shifting portion may be arranged on and protrude from a periphery of the first barrel body, and located at a center of the connecting portion. The first barrel body may be configured to rotate about an axis of the first barrel body when the shifting portion is shifted.

In some embodiments, a through hole may be provided at a center of the shifting portion Two plunger holes may be provided on a periphery of the second barrel body. A distance between centers of the two plunger holes may be equal to a length of the connecting portion. The gimbal may further comprise a plunger disposed within the through hole and configured to match with one of the two plunger holes when the first barrel rotates to the position that the first stopping boss abuts against the second stopping boss.

In some embodiments, the second barrel body may comprise a step face extending outward and configured to abut against an end face of the horizontal end. The step face may be configured to connect the first barrel body and the second barrel body to sleeve the second barrel body within the first barrel body.

In some embodiments, the second stopping boss may include an arc-shaped strip provided on the connecting plate and may be attached with an end face of the vertical end.

In some embodiments, the first barrel body may comprise three passages disposed on the end portion of the sliding slot adjacent to the first end. The plug-in member may comprise three protruding bars matching with the three passages, respectively.

In some embodiments, the first barrel body may further comprise three strip-shaped protrusions protruding on an inner wall of the first end. The three strip-shaped protrusions may each be an arc-shaped strip. The three strip-shaped protrusions and an end face of the horizontal end may form the sliding slot. The three passages may be formed between the three strip-shaped protrusions.

In some embodiments, the three protruding bars may each be an arc-shaped protruding bar provided on the periphery of the plug-in member.

In some embodiments, the gimbal may further comprise a first connector disposed on the connecting plate and a second connector provided on the plug-in member. The first connector and the second connector may be configured to be electrically connected with each other when the first stopping boss abuts against the second stopping boss.

In some embodiments, the quick release assembly may further comprise an elastic member elastically connected between the plug-in member and the first barrel body in an axial direction.

In some embodiments, the elastic member may include a cushion and be configured to be compressed by the first barrel body when the plug-in member is connected with the first barrel body.

In some embodiments, the gimbal may further comprise two guiding posts disposed on the plug-in member. The two guiding posts may penetrate through the elastic member and be disposed symmetrically relative to a center of the elastic member. Two guiding holes may be provided on the second barrel body. The two guiding posts may be inserted through the two guiding holes.

According to another aspect of the present disclosure, there is provided an unmanned aerial vehicle comprising the imaging device of any one of those described above.

According to another aspect of the present disclosure, there is provided an unmanned aerial vehicle comprising the gimbal of any one of those described above.

Advantageous effects of the present disclosure is that, in comparison with the conventional technologies, the quick release assembly and the at least angle adjusting mechanism of the gimbal of the present disclosure are arranged side by side on the carrying plate. This may reduce the altitude of the gimbal, thereby decreasing the altitude of an unmanned aerial vehicle in a vertical direction, achieving a more compact structure, and improving aesthetics of appearance of the unmanned aerial vehicle.

DETAILED DESCRIPTION OF THE EMBODIMENTS

Figure 1:
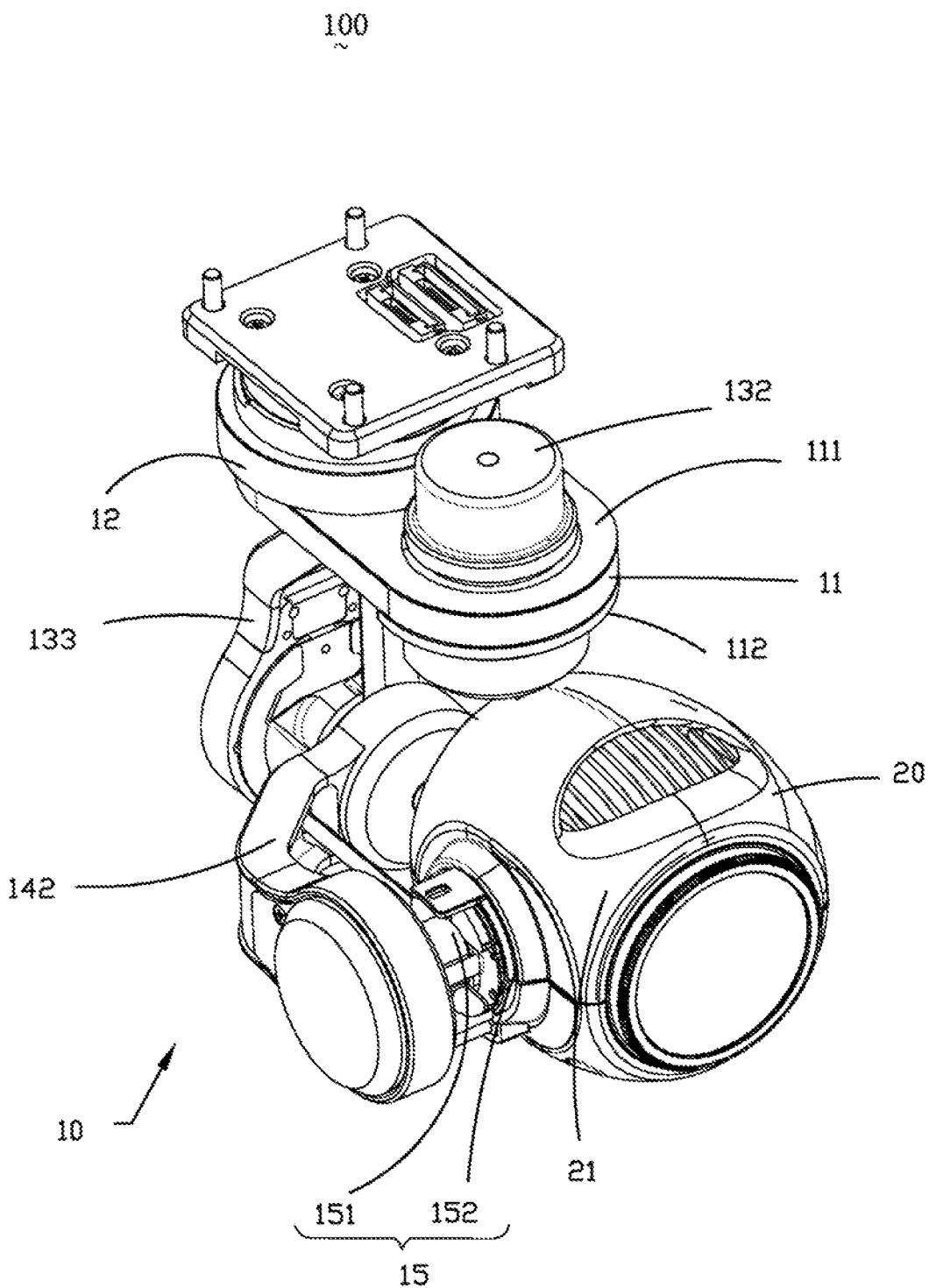
FIG. 1 is a perspective assembly view of an imaging device provided by a first embodiment of the present disclosure.
Figure 2:
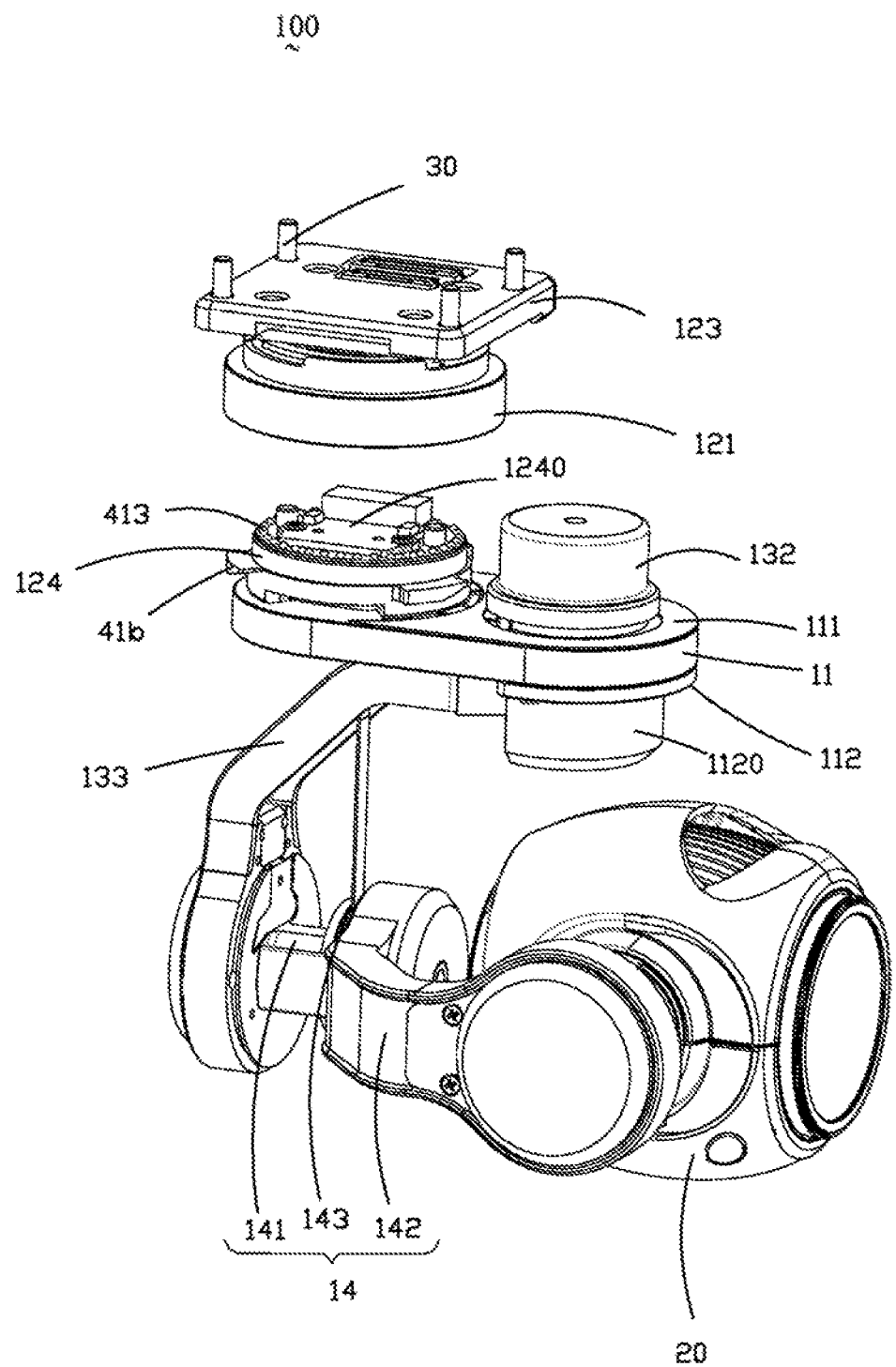
FIG. 2 is a perspective exploded view of the imaging device in FIG. 1.
Figure 3:
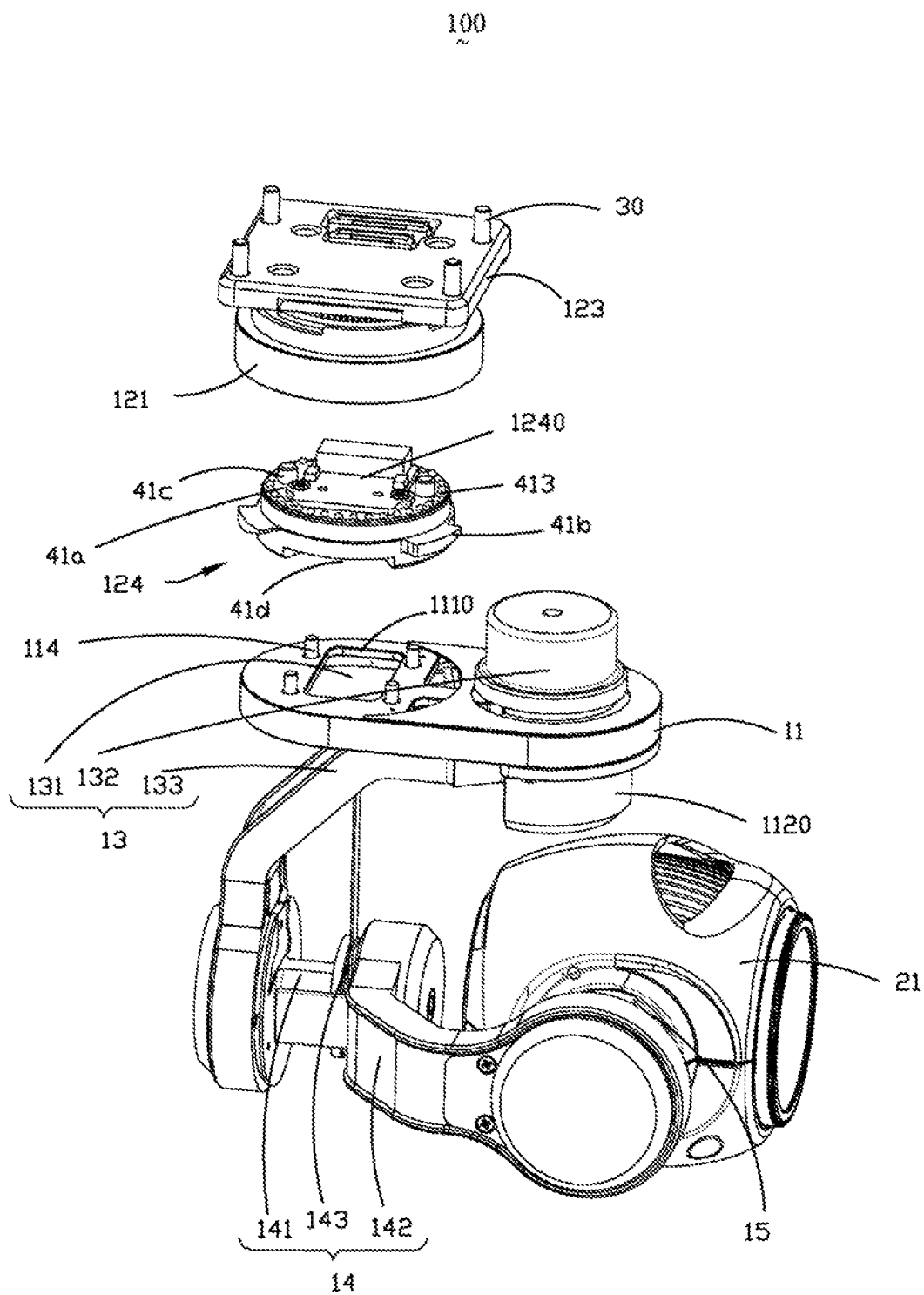
FIG. 3 is a perspective exploded view of the imaging device in FIG. 2 from another angle of view.
Figure 4:
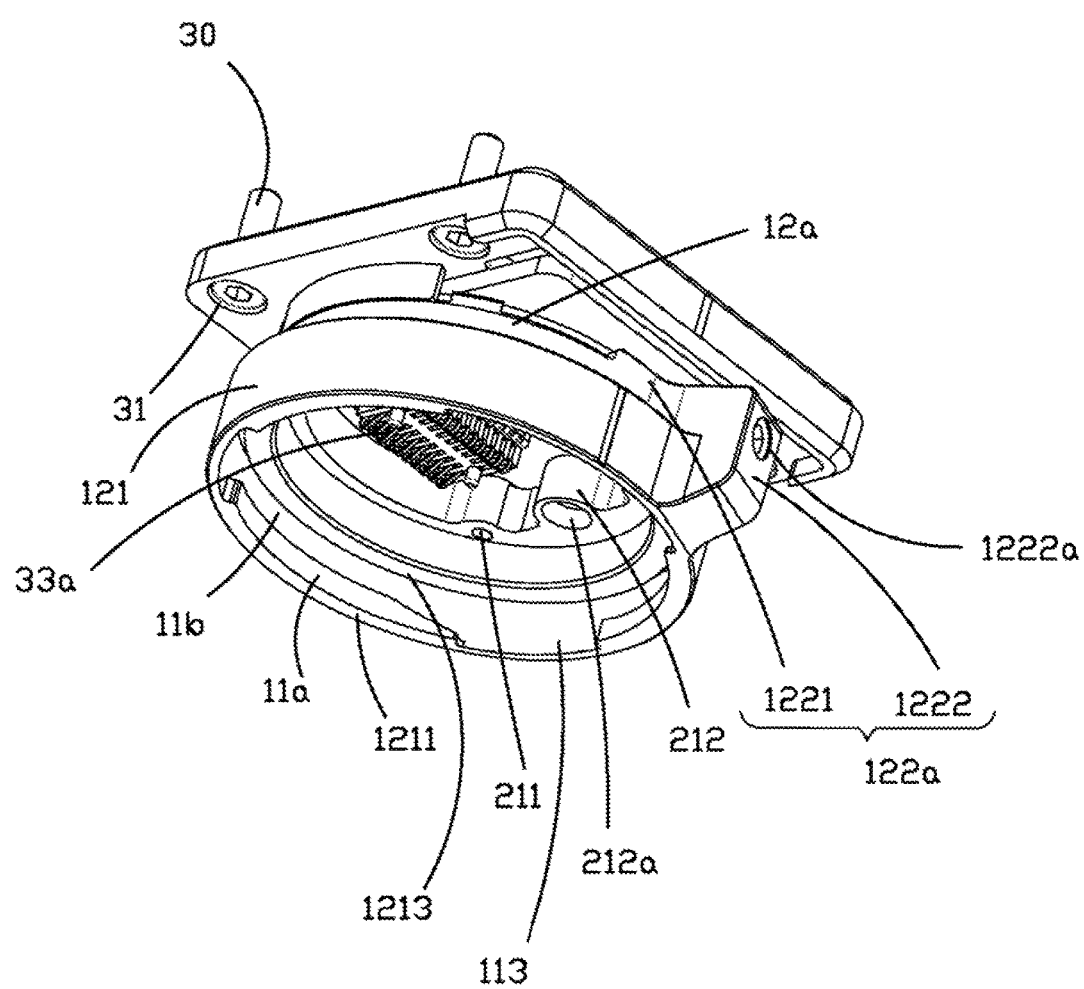
FIG. 4 is a perspective assembly view of a quick release device of the imaging device in FIG. 3.
Figure 5:
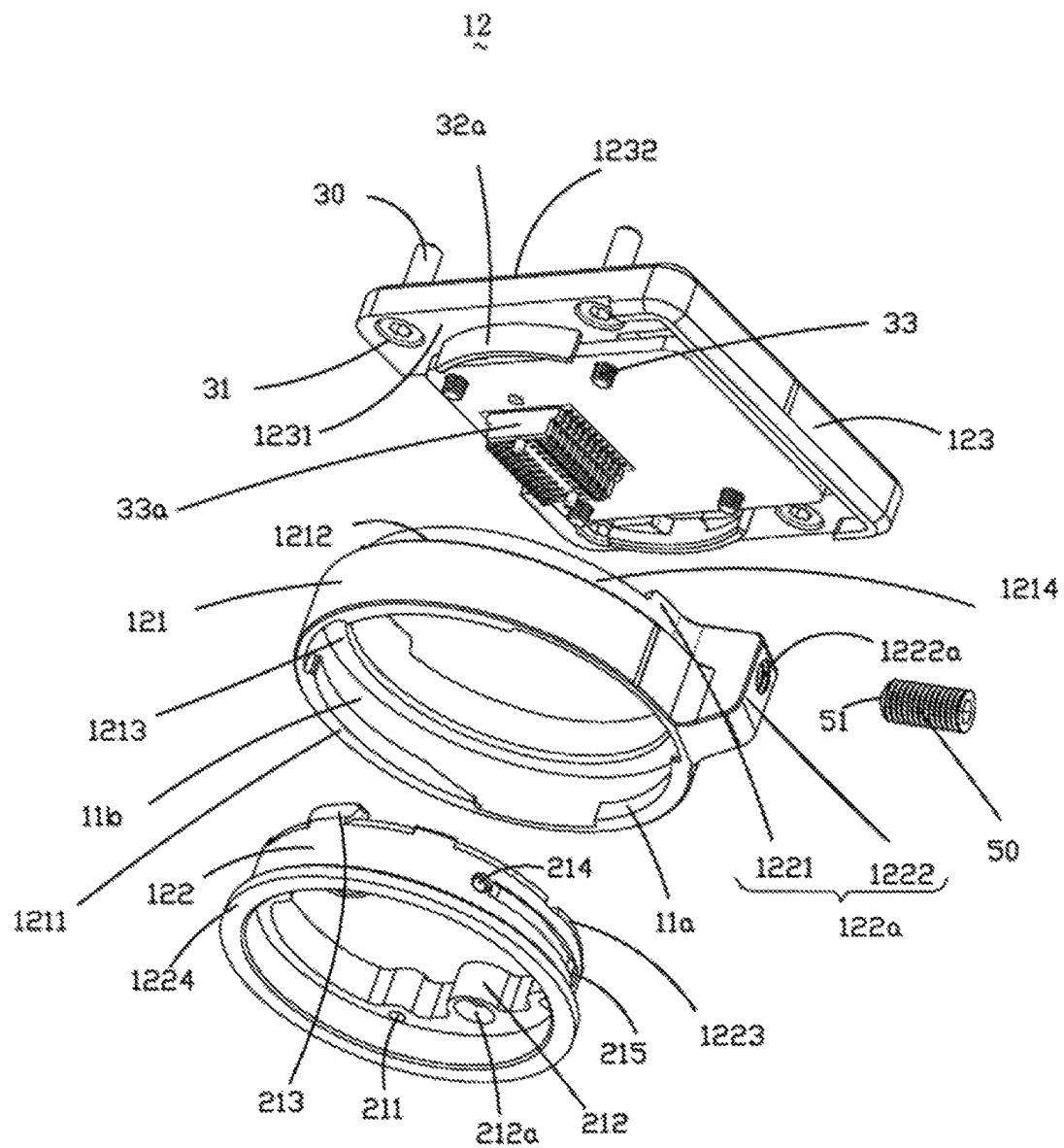
FIG. 5 is a perspective exploded view of the quick release device of the imaging device in FIG. 4.

Exemplary embodiments of the present disclosure will be described in more detail below in combination with the drawings. It should be appreciated that embodiments described herein are only some rather than all of the embodiments of the present disclosure. All other embodiments obtained by those having ordinary skills in the art on the basis of the embodiments of the present disclosure without any inventive efforts should fall within the scope of the present disclosure.

Referring to FIG. 1 to FIG. 5, an imaging device 100 consistent with embodiments of the present disclosure may be disposed at an unmanned aerial vehicle (not shown). The unmanned aerial vehicle may be used as an auxiliary device for video shooting, photographing, monitoring, or sampling, and carried by, for example, a air-based vehicle (such as a rotary-wing aerial vehicle or a fixed-wing aerial vehicle), a water-based vehicle (such as a submarine or a ship), a road-based vehicle (such as a motor vehicle), or a space-based field (such as a satellite, a space station, or a spaceship), or the like. The unmanned aerial vehicle may comprise a gimbal and a load carried by the gimbal. The gimbal may be used to fix the load, adjust an attitude of the load (such as altering an altitude, an inclination angle, and/or a direction of the load), and keep the load at a determined attitude stably. The load may be a photographic device such as a camera, a video camera, or the like, including the imaging device 100.

The imaging device 100 may comprise a gimbal 10 and a photographic element 20 that is disposed on the gimbal 10 and capable of rotating under a driving of the gimbal 10.

In some embodiments, the gimbal 10 may be a triaxial gimbal and, as shown in the figures, comprise a carrying plate 11, a quick release assembly 12 detachably mounted on the carrying plate 11, a first angle adjusting mechanism 13 rotatably disposed on the carrying plate 11, a second angle adjusting mechanism 14 rotatably disposed on the first angle adjusting mechanism 13, and a third angle adjusting mechanism 15 rotatably disposed on the second angle adjusting mechanism 14. The photographic element 20 may be directly connected with the third angle adjusting mechanism 15.

In some embodiments, the carrying plate 11 may be a flat plate and, as shown in the figures, comprise a first surface 111 and a second surface 112 opposite to the first surface 111. The first surface 111 may be approximately parallel to the second surface 112. A receiving groove 1110 may be provided on the first surface 111. Four positioning posts 114 may be also provided on the first surface 111 and surround the receiving groove 1110.

The quick release assembly 12 may comprise a first barrel body 121, a second barrel body 122 received within the first barrel body 121, a connecting plate 123 fixedly connected with the second barrel body 122, a plug-in member 124 detachably mounted between the first barrel body 121 and the second barrel body 122. The first barrel body 121 may be coaxial with and rotatable relative to the second barrel body 122.

The first barrel body 121 may have a through cylindrical structure, and comprise a first end 1211 and a second end 1212 that are disposed opposite to each other in an axial direction of the first barrel body 121. A side plate 12a may be provided on and extend upward from an end face of the second end 1212. The side plate 12a may be an L-shaped side plate. Specifically, the side plate 12a may comprise a horizontal end 1213 and a vertical end 1214. The vertical end 1214 may be connected with the horizontal end 1213 and be approximately perpendicular to the horizontal end 1213 and the second end 1212.

A first stopping boss 122a may be provided on the vertical end 1214 and comprise a connecting portion 1221 and a shifting portion 1222. The connecting portion 1221 may be disposed on an end face of the vertical end 1214, and be an arc-shaped protruding bar. The shifting portion 1222 may be disposed on the periphery of the first barrel body 121 and located at the center of the connecting portion 1221. The shifting portion 1222 may be a trapezoid boss protruding along the periphery of the first barrel body 121 and formed integrally with the first barrel body 121. The shifting portion 1222 may make it easier to hold tine first barrel body 121 by hand. A threaded through hole 1222a may be provided in the shifting portion 1222. In some embodiments, the threaded through hole 1222a may be provided at the center of the shifting portion 1222.

At least one strip-shaped protrusion 11a may be provided on and extend circumferentially along an inner wall of the first end 1211. In some embodiments, three strip-shaped protrusions 11a may be provided on the inner wall of the first end 1211 and may each be an arc-shaped strip extending along the inner wall of the first end 1211. In order to facilitate connection, one end of each one of the three strip-shaped protrusions 11a may be provided with a chamfer. It can be understood that, in other embodiments, the number of the strip-shaped protrusions 11a may not necessarily be three and can be, for example, one, two, or four.

A sliding slot 11b may be formed between the three strip-shaped protrusions 11a and an end face of the horizontal end 1213 of the side plate 12a, and may be an arc-shaped slot extending circumferentially along the inner wall of the first end 1211. In some embodiments, the sliding slot 11b may be a circular slot extending along the inner wall of the first end 1211.

At least one passage 113 may be provided at an end portion of the sliding slot 11b, and may be an arc-shaped slot extending circumferentially along the inner wall of the first end 1211. In some embodiments, three passages 113 may be provided, each of which may be formed between two neighboring ones of the three strip-shaped protrusions 11a. In some other embodiments, the number of the passages 113 may be, for example, one, two, or four. The at least one passage 113 may be in another shape, such as a circular shape, a square shape, or a U shape.

In some embodiments, the second barrel body 122 may have a through cylindrical structure. The second barrel body 122 may be a flange structure. The second barrel body 122 may be received within the first barrel body 121 and rotatably and coaxially connected with the first barrel body 121. The second barrel body 122 may comprise a third end 1223 and a fourth end 1224 that are disposed opposite to each other in an axial direction of the second barrel body 122. The third end 1223 may have a circular ring structure. Four threaded holes 211 may be provided on an end face of the third end 1223, and arranged in a quadrilateral that is symmetric with respect to the axis of the second barrel body 122. Two studs 212 may be provided on and protrude from the inner wall of the third end 1223, and disposed symmetrically relative to the axis of the second barrel body 122. A guiding through hole 212a may be provided on each of the two stubs 212. The two guiding through holes 212a may function as a guide when the second barrel body 122 is connected with another part. Two connecting blocks 213 may be provided on the end face of the third end 1223, and disposed symmetrically relative to the center of the second barrel body 122. The two connecting blocks 213 may each be a rectangular block, and function as a support and guide when the second barrel body 122 is connected with another part.

Two plunger holes, e.g., a first plunger hole 214 and a second plunger hole 215, may be provided in the circumferential direction of the third end 1223. The distance between centers of the first plunger hole 214 and the second plunger hole 215 may equal the length of the first stopping boss 122a, thereby facilitating a match between the first barrel body 121 and the second barrel body 122.

The fourth end 1224 may be a step face extending outward from the third end 1223, and configured to connect the first barrel body 121 and the second barrel body 122. When the second barrel body 122 is sleeved within the first barrel body 121, the fourth end 1224 may abut against the end face of the horizontal end 1213 of the side plate 12a, to prevent the second barrel body 122 from disengaging from the first barrel body 121, so that the first barrel body 121 may rotate about its own axis relative to the second barrel body 122.

Further, the first barrel body 121 can be rotated about its own axis by shifting the shifting portion 1222 of the first stopping boss 122a.

The connecting plate 123 may be fixedly connected with the second barrel body 122. The connecting plate 123 may be a square thin plate, and fixedly connected with the second barrel body 122 through screws 33. Specifically, four screws 33 may be disposed at positions of the connecting plate 123 corresponding to the four threaded holes 211 on the end face of the third end 1223 of the second barrel body 122. The four screws 33 may match with the four threaded holes 211, respectively, to fixedly connect the connecting plate 123 with the second barrel body 122.

In some embodiments, four holes 31 may be provided on the connecting plate 123. The four holes 31 may match with four studs 30, respectively, to fixedly connect the connecting plate 30 with the unmanned aerial vehicle.

The connecting plate 123 may comprise a first end face 1231 and a second end face 1232 disposed opposite to each other. The first end face 1231 may be orientated towards the second barrel body 122. A second stopping boss 32a, which may be an arc-shaped protruding bar, may be provided on the first end fibre 1231. The second stopping boss 32a may be attached to the end face of the vertical end 1214 of the side plate 12a, and can abut against the connecting portion 1221 of the first stopping boss 122a to limit a rotating position of the first barrel body 121. When the first barrel body 121 rotates to a position that the connecting portion 1221 abuts against the second stopping boss 32a, the first barrel body 121 may be stopped from rotating by the stopping action of the second stopping boss 32a.

A first connector 33a may be disposed on the first end face 1231, and configured to receive a signal from the unmanned aerial vehicle connected on the connecting plate 123.

The plug-in member 124 may be detachably connected with the first barrel body 121 through four positioning posts 114. In some embodiments, the plug-in member 124 may have a circular disc-shaped, plate-like structure. At least one protruding bar 41b may be arranged on and protrude from the periphery of the plug-in member 124, and match correspondingly with the at least one passage 113. The at least one protruding bar 41b can enter into or exit from the sliding slot 11b through the at least one passage 113. In some embodiments, three protruding bars 41b may be provided. The three protruding bars 41b may match with the three passages 113, respectively.

Further, the three protruding bars 41b may each be an arc-shaped protruding bar provided on the periphery of the plug-in member 124.

When the plug-in member 124 is connected with the first barrel body 121, the at least one protruding bar 41b may be matched with the at least one passage 113, respectively.

In some embodiments, the plug-in member 124 may be provided with an elastic member 41a and a second connector 1240. The elastic member 41a may be a cushion. When the plug-in member 124 is connected with the first barrel body 121, the first barrel body 121 may compress the elastic member 41a, thereby enhancing a strength of the connection between the plug-in member 124 and the first barrel body 121. The elastic member 41a may be bonded on the plug-in member 124. In the present embodiment, the elastic member 41a may be bonded on the plug-in member 124 by an adhesive. A plurality of bumps 413 may be provided on and protrude from the elastic member 41a. The bumps 413 may be distributed evenly along the circumference of the elastic member 41a and be configured to increase a friction force between the plug-in member 124 and the first barrel body 121. In some other embodiments, the elastic member 41a may be another type of elastic component, such as a rubber gasket, a rubber pad, or a silica gel pad, or the like.

Further, when the plug-in member 124 is connected with the first barrel body 121, the elastic member 41a may be compressed due to the pressure of the first barrel body 121, thereby improving the connection between the plug-in member 124 and the first barrel body 121, ensuring the tightness of the connection between the plug-in member 123 and the first barrel body 121. The bumps 413 provided on the elastic member 41a allow the elastic member 41a to be further compressed, thereby enhancing the friction force, and hence the connection strength, between the first barrel body 121 and the plug-in member 124. In addition, when the unmanned aerial vehicle connected on the connecting plate 123 flies in the air, the unmanned aerial vehicle may vibrate due to the resistance of the air. The elastic member 41a may also reduce the vibration of the unmanned aerial vehicle, making the unmanned aerial vehicle to fly more smoothly.

Two guiding posts 41c may be provided on the plug-in member 124 and disposed symmetrically relative to the center of the plug-in member 124. Further, the two guiding posts 41c may penetrate through the elastic member 41a. The two guiding posts 41c may be inserted through the two guiding through holes 212a on the second barrel body 122, thereby enabling the plug-in member 124 and the first barrel body 121 to connect along a straight line, enhancing the smoothness of the connection between the plug-in member 124 and the first barrel body 121.

When the first barrel body 121 rotates to a position that the connecting portion 1221 of the first stopping boss 1226 abuts against the second stopping boss 32a, the at least one protruding bar 41b can enter into or exit from the sliding slot 11b through the at least one passage 113, so as to lock the plug-in member 124 onto or separate the plug-in member 124 from the first barrel body 121.

Specifically, in some embodiments, when the at least one protruding bar 41b is located in the sliding slot 11b, the plug-in member 124 may be locked on the first barrel body 121 by rotating the first barrel body 121 along a first direction (and hence the at least one protruding bar 41b may slide in the sliding slot 11b along the first direction) to a first position that a first end of the connecting portion 1221 of the first stopping boss 122a abuts against the second stopping boss 32a.

When the first barrel body 121 rotates along a second direction, the at least one protruding bar 41b may slide in the sliding slot 11b along the second direction. When the first barrel body 121 rotates to a second position that a second end of the connecting portion 1221 of the first stopping boss 122a abuts against the second stopping boss 32a, the at least one protruding bar 41b may slide to a position corresponding to the at least one passage 113. At this time, the at least one protruding bar 41b can slide out of the sliding slot 11b through the at least one passage 113, so as to separate the plug-in member 124 from the first barrel body 121. The first and second ends of the connecting portion 1221 are opposite to each other.

Therefore, as described above, the plug-in member 124 and the first barrel body 121 may be locked to and separated from each other, allowing a quick release and assembly.

The first direction may be opposite to the second direction. In some embodiments, the first direction may be a counter-clockwise direction, and the second direction may be a clockwise direction. In some other embodiments, the first direction may be a clockwise direction, and the second direction may be a counter-clockwise direction.

The quick release assembly 12 of the gimbal may further comprise a plunger 50 disposed on the shifting portion 1222. In some embodiments, the plunger 50 may be disposed within the through hole 1222a. The plunger 50 may comprise a tip portion 51 that has a spherical structure. When the first barrel body 121 rotates to a position that the first stopping boss 122a abut against the second stopping boss 32a, the tip portion 51 of the plunger 50 may be matched with the first plunger hole 214 or the second plunger hole 215.

Specifically, when the first barrel body 121 rotates along the first direction to the first position that the first end of the connecting portion 1221 of the first stopping boss 122a abuts against the second stopping boss 32a, the plug-in member 40 may be locked on the first barrel body 121. At this time, the tip portion 51 may be matched with the first plunger hole 214 and a sound is made, allowing a user to quickly and conveniently determine that the plug-in member 40 has been locked to the first barrel body 121. Further, at this time, the first connector 33a may be electrically connected with the second connector 1240. Likewise, when the first barrel body 121 rotates along the second direction to the second position that the second end of the connecting portion 1221 of the first slopping boss 122a abuts against the second stopping boss 32a, the tip portion 51 may be matched with the second plunger hole 215 and a sound is made, allowing the user to quickly determine that the first barrel body 121 and the plug-in member 40 are now in a state that they can be separated from each other. Then, the plug-in member 40 may be separated from the first barrel body 121. In addition, since a noise may be made when the plunger 50 matches with the first plunger hole 214 or the second plunger hole 215, a better feel can be achieved when the shifting portion 1222 is turned, and hence the user experience can be improved.

The first angle adjusting mechanism 13 may comprise a first electronic speed adjustor 131, a yaw-axis motor 132 electrically connected with the first electronic speed adjustor 131, and a first bracket 133 rotatably connected with the yaw-axis motor 132. The first electronic speed adjustor 131 may be disposed within the receiving groove 1110 and covered by the quick release assembly 12. The yaw-axis motor 132 and the quick release assembly 12 may be arranged side by side on the carrying plate 11. The second surface 112 of the carrying plate 11 may be provided with a stopping device 1120. In some embodiments, the yaw-axis motor 132 may be a brushless motor and a rotating shaft of the yaw-axis motor 132 may be received within the stopping device 1120. One end of the first bracket 133 may be received within the stopping device 1120 and connected with the rotating shaft of the yaw-axis motor 132, so that the first bracket 133 may rotate synchronously with the rotating shaft of the yaw-axis motor 132 under a driving of the yaw-axis motor 132.

The second angle adjusting mechanism 14 may comprise a second electronic speed adjustor, a first connecting shaft 141, a second bracket 142, and a roll-axis motor 143. The second electronic speed adjustor may be received at another end of the first bracket 133, i.e., an end distal from the carrying plate 11. One end of the first connecting shaft 141 may be fixed to an end of the first bracket 133 distal from the carrying plate 11. Another end of the first connecting shaft 141 may be connected to an end of the second bracket 142 through the roll-axis motor 143. Specifically, the roll-axis motor 143 may be a brushless motor. A stator of the roll-axis motor 143 may be fixed to the first connecting shaft 141, while a rotator of the roll-axis motor 143 may be received at an end of the second bracket 142.

A third angle adjusting mechanism 15 may comprise a third electronic speed adjustor, a second connecting shaft 151, and a pitch-axis motor 152. The third electronic speed adjustor may be received at another end of the second bracket 142, i.e., an end distal from the first bracket 133. One end of the second connecting shaft 151 may be fixed to an end of the second bracket 142 distal from the first bracket 133. Another end of the second connecting shaft 151 may be connected to the photographic element 20 through the pitch-axis motor 152. Specifically, the pitch-axis motor 152 may be a brushless motor. A stator of the pitch-axis motor 152 may be fixed to the second connecting shaft 151, while a rotator of the pitch axis motor 152 may be received within a casing 21 of the photographic element 20.

The photographic element 20 may comprise an image sensor and an image processing circuit received within the casing 21. The image sensor may be one of a CCD sensor or a CMOS sensor. The image processing circuit may be electrically connected with the image sensor. The photographic element 20 may be configured to take an image or a moving picture.

It can be understood that, in some other embodiments, the gimbal 10 may be designed to comprise only a first adjusting mechanism and a second adjusting mechanism that are connected in sequence and configured to rotate a load around different rotating shafts. In some embodiments, only the second adjusting mechanism (a roll angle adjusting mechanism) or a third adjusting mechanism (a pitch angle adjusting mechanism) may be provided.

In some embodiments, the gimbal 10 may be designed to comprise a plurality of angle adjusting mechanisms that are connected in sequence and configured to rotate the photographic element 20 around different rotating shafts.

It can be understood that, the structure of the quick release assembly 12 is not limited to the exemplary embodiments described herein, as long as a quick release function is implemented.

It can be understood that, the gimbal consistent with the present disclosure can be used to carry a load different from the photographic element 20, such as a sprayer or the like, which is not limited to the exemplary embodiments described herein.

Figure 6:
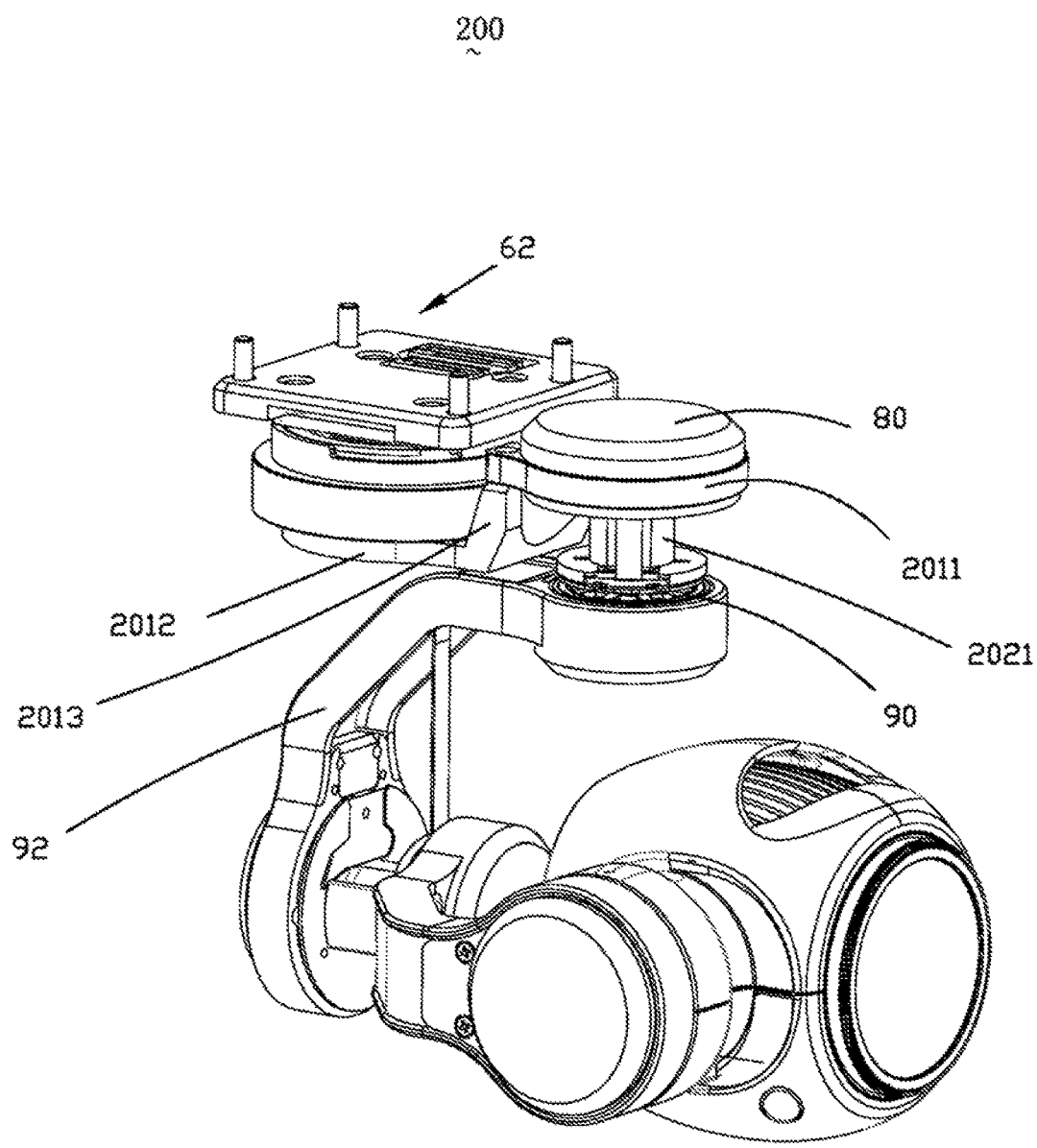
FIG. 6 is a perspective assembly view of an imaging device provided by a second embodiment of the present disclosure.
Figure 7:
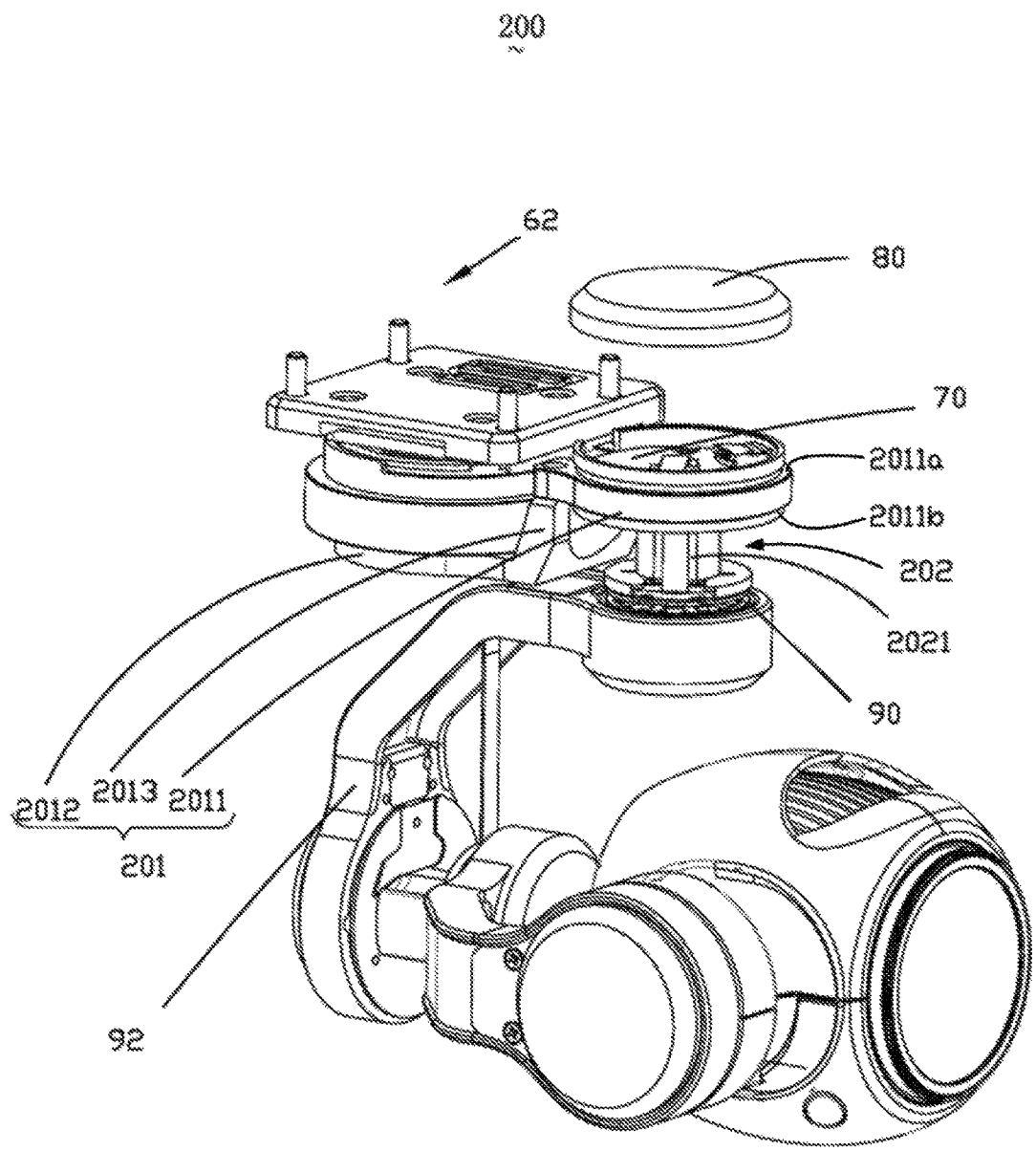
FIG. 7 is a perspective exploded view of the imaging device in FIG. 6.

Referring to FIG. 6 and FIG. 7, an imaging device 200 consistent with embodiments of the present disclosure is similar to the imaging device 100 described above in terms of structure. The imaging device 200 differs from the imaging device 100 in, for example, that, the structure of a carrying plate 201 and the structure of a first angle adjusting mechanism 202 are different from the structures of the corresponding parts in the imaging device 100.

In some embodiments, as shown in FIG. 6 and FIG. 7, the carrying plate 201 may have a staggered structure, such as a "Z"-shaped structure. The carrying plate 201 may comprise a first carrying portion 2011, a second carrying portion 2012, and a connecting portion 2013 connecting the first carrying portion 2011 and the second carrying portion 2012. An altitude of the first carrying portion 2011 along its vertical direction may be greater than an altitude of the second carrying portion 2012 along a direction perpendicular to the first carrying portion 2011. The connecting portion 2013 may be connected between the first carrying portion 2011 and the second carrying portion 2012. A quick release assembly 62 may be carried on the second carrying portion 2012. The first carrying portion 2011 may comprise a first plane 2011a and a second plane 2011b arranged away from the first plane 2011a. The first plane 2011a may be approximately parallel to the second plane 2011b. A first electronic speed adjustor 70 may be disposed on the first plane 2011a. A cover body 80 may be disposed on the carrying plate 201, and cover the electronic speed adjustor 70 for protecting the electronic speed adjustor 70.

In some embodiments, the first angle adjusting mechanism 202 may further comprise a yaw motor connecting shaft 2021. One end of the yaw motor connecting shaft 2021 is fixed on the second plane 2011b. The other end of the yaw motor connecting shaft 2021 is connected to an end of a first bracket 92 through a yaw-axis motor 90. In some embodiments, the yaw-axis motor 90 is a brushless motor. The stator of the yaw-axis motor 90 is fixed to the yaw motor connecting shall 2021 and the rotator of the yaw-axis motor 90 is received at n end of the first bracket 92.

The quick release assembly and at least one angle adjusting mechanism of the gimbal of the present disclosure are arranged side by side on the carrying plate, which may reduce the altitude of the gimbal, thereby decreasing the altitude of the unmanned aerial vehicle in a vertical direction, achieving a more compact structure, and improving aesthetics of appearance of the unmanned aerial vehicle.

The foregoing disclosure is merely illustrative of the embodiments of the disclosure, and is not intended to limit the scope of the disclosure. Any equivalent structural or flow variations made on the basis of the description and the drawings of the disclosure, and their direct or indirect application to other relevant technical fields, shall all fall into the scope of the disclosure.

What is claimed is:

1. A gimbal comprising:
   a carrying plate;
   a quick release assembly detachably mounted on the carrying plate and configured to detachably mount the gimbal on an unmanned aerial vehicle; and
   an angle adjusting mechanism rotatably disposed on the carrying plate and configured to connect with a load and to drive the load to rotate,
   wherein the quick release assembly and the angle adjusting mechanism are arranged side by side on the carrying plate.

2. The gimbal of claim 1, wherein the angle adjusting mechanism comprises an electronic speed adjustor, a yaw-axis motor electrically connected with the electronic speed adjustor, and a bracket rotatably connected with the yaw-axis motor.

3. The gimbal of claim 2, wherein:
   the carrying plate is a flat plate comprising a first surface including a receiving groove and a second surface arranged opposite to the first surface, and
   the electronic speed adjustor is disposed within the receiving groove and covered by the quick release assembly.

4. The gimbal of claim 3, further comprising:
   a stopping device provided on the second surface of the carrying plate,
   wherein:
   a rotating shaft of the yaw-axis motor is received in the stopping device, and
   one end of the bracket is received within the stopping device and connected with the rotating shaft of the yaw-axis motor.

5. The gimbal of claim 2, wherein the carrying plate has a "Z"-shaped structure and comprises:

a first carrying portion comprising a first plane and a second plane arranged opposite to each other, the first electronic speed adjustor being disposed on the first plane;

a second carrying portion carrying the quick release assembly; and a connecting portion connecting the first carrying portion and the second carrying portion, wherein an altitude of the first carrying portion along a vertical direction of the first carrying portion is greater than an altitude of the second carrying portion along a direction perpendicular to the first carrying portion.

6. The gimbal of claim 5, further comprising:

a cover body disposed on the carrying plate and covering the electronic speed adjustor.

7. The gimbal of claim 5, wherein the angle adjusting mechanism further comprises a yaw motor connecting shaft, one end of the yaw motor connecting shaft being fixed on the second plane, and another end of the yaw motor connecting shaft being connected to one end of the bracket through the yaw-axis motor.

8. The gimbal of claim 7, wherein the yaw-axis motor is a brushless motor, a stator of the yaw-axis motor being fixed to the yaw motor connecting shaft, and a rotator of the yaw-axis motor being received at the one end of the bracket.

9. The gimbal of claim 2, wherein the angle adjusting mechanism is a first angle adjusting mechanism, the electronic speed adjustor is a first electronic speed adjustor, and the bracket is a first bracket, the gimbal further comprising:

a second angle adjusting mechanism, comprising:
a second electronic speed adjustor;
a connecting shaft;
a second bracket; and
a roll-axis motor,
wherein:
the second electronic speed adjustor is received at one end of the first bracket distal from the carrying plate,
one end of the connecting shaft is fixed to the one end of the first bracket distal from the carrying plate, and
another end of the connecting shaft is connected to one end of the second bracket through the roll-axis motor.

10. The gimbal of claim 9, wherein the roll-axis motor is a brushless motor, a stator of the roll-axis motor being fixed to the connecting shaft, and a rotator of the roll-axis motor being received at the one end of the second bracket.

11. The gimbal of claim 9, wherein the connecting shaft is a first connecting shaft, the gimbal further comprising:

a third angle adjusting mechanism, comprising:
a third electronic speed adjustor;
a second connecting shaft; and
a pitch-axis motor,
wherein:
the third electronic speed adjustor is received at another end of the second bracket distal from the first bracket,
one end of the second connecting shaft is fixer to the other end of the second bracket distal from the first bracket, and
another end of the second connecting shaft is configured to be connected to the load through the pitch-axis motor.

12. The gimbal of claim 1, wherein the load is a photographic element comprising:

a casing; and an image sensor and an image processing circuit received within the casing, the image processing circuit being electrically connected with the image sensor.

13. The gimbal of claim 1, wherein the quick release assembly comprises:

a first barrel body comprising a first end and a second end disposed opposite to each other in an axial direction of the first barrel body, wherein:

a sliding slot is provided on an inner wall of the first end and extends along a circumferential direction of the inner wall, a passage being formed at an end portion of the sliding slot, and a first stopping boss is provided on an end face of the second end;

a second barrel body received within the first barrel body, the first barrel body and the second barrel body being coaxial and rotatably connected with each other;

a plug-in member detachably mounted between the first barrel body and the second barrel body, a protruding bar being formed on and protruding from a periphery of the plug-in member, the protruding bar matching with the passage and being configured to enter into or exit from the sliding slot through the passage; and a connecting plate fixedly connected with the second barrel body and configured to connect with the unmanned aerial vehicle, a second stopping boss being provided on the connecting plate and configured to abut against the first stopping boss to limit a rotating position of the first barrel body, wherein the first barrel body is configured to rotate a position that the first stopping boss abuts against the second stopping boss to allow the protruding bar to enter into or exit from the sliding slot through the passage.

14. The gimbal of claim 13, wherein:

the first barrel body further comprises a side plate provided on and extending outward on the second end, the side plate comprising a horizontal end and a vertical end, the first stopping boss comprises:

a connecting portion disposed on an end face of the vertical end and including an arc-shaped protruding bar; and a shifting portion arranged on and protruding from a periphery of the first barrel body, and located at a center of the connecting portion, and the first barrel body is configured to rotate about an axis of the first barrel body when the shifting portion is shifted.

15. The gimbal of claim 14, wherein:

a through hole is provided at a center of the shifting portion, and two plunger holes are provided on a periphery of the second barrel body, a distance between centers of the two plunger holes being equal to a length of the connecting portion, the gimbal further comprising:

a plunger disposed within the through hole and configured to match with one of the two plunger holes when the first barrel rotates to the position that the first stopping boss abuts against the second stopping boss.

16. The gimbal of claim 14, wherein the second barrel body comprises a step face extending outward and configured to abut against an end face of the horizontal end, the step face being configured to connect the first barrel body and the second barrel body to sleeve the second barrel body within the first barrel body.

17. The gimbal of claim 14, wherein the second stopping boss includes an arc-shaped strip provided on the connecting plate and is attached with an end face of the vertical end.

18. The gimbal of claim 14, wherein:
   the first barrel body comprises three passages disposed on the end portion of the sliding slot adjacent to the first end, and
   the plug-in member comprises three protruding bars matching with the three passages, respectively.

19. The gimbal of claim 13, further comprising:
   a first connector disposed on the connecting plate; and
   a second connector provided on the plug-in member,
   wherein the first connector and the second connector are configured to be electrically connected with each other when the first stopping boss abuts against the second stopping boss.

20. The gimbal of claim 13, wherein the quick release assembly further comprises a cushion elastically connected between the plug-in member and the first barrel body in an axial direction, the cushion being configured to be compressed by the first barrel body when the plug-in member is connected with the first barrel body.

* * * * *